April 13, 1954  F. W. SIDE  2,675,441
SWITCHING DEVICE
Filed Dec. 6, 1951  3 Sheets-Sheet 1
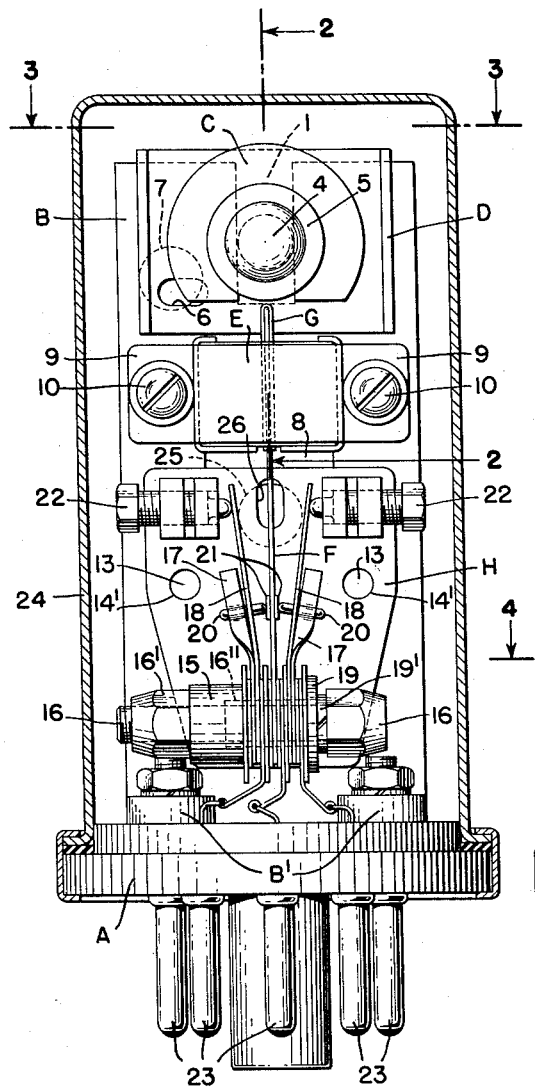
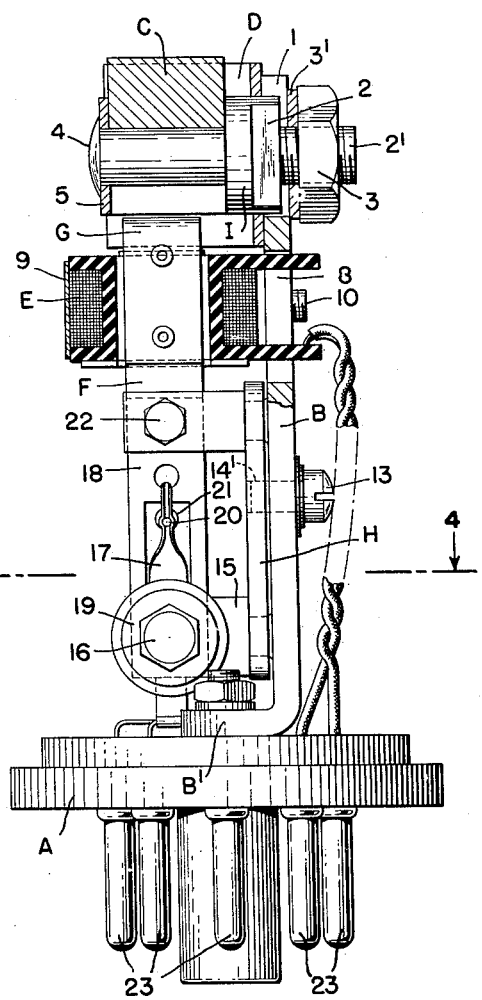
INVENTOR.
FREDERICK W. SIDE
BY
ATTORNEY.

April 13, 1954   F. W. SIDE   2,675,441
SWITCHING DEVICE
Filed Dec. 6, 1951   3 Sheets-Sheet 2

INVENTOR.
FREDERICK W. SIDE
BY *Arthur H. Swanson*
ATTORNEY.

April 13, 1954     F. W. SIDE     2,675,441
SWITCHING DEVICE

Filed Dec. 6, 1951     3 Sheets-Sheet 3

INVENTOR.
FREDERICK W. SIDE

BY Arthur H. Swanson

ATTORNEY.

Patented Apr. 13, 1954

2,675,441

UNITED STATES PATENT OFFICE 2,675,441

SWITCHING DEVICE

Frederick W. Side, Philadelphia, Pa., assignor to Minneapolis-Honeywell Regulator Company, Minneapolis, Minn., a corporation of Delaware Application December 6, 1951, Serial No. 260,127

11 Claims. (Cl. 200—90)

The general object of the present invention is to provide improved electrical switching devices, and particularly to provide electrical switching devices of the vibratory converter type disclosed in my prior Patent No. 2,423,524 of July 8, 1947, and in my prior Patent No. 2,587,236 of February 26, 1952. The present invention, like the inventions of my above mentioned prior patents, has especial utility for use in converting a small unidirectional electrical current into an alternating current which may be readily amplified, for measuring and other purposes, in the general manner disclosed in the Wills Patent No. 2,423,540 of July 8, 1947. In the present invention, as in my above mentioned prior patents, I make use of a vibratile element which closes and opens electric circuits as it moves back and forth between its two limits of motion.

A major object of the present invention is to provide novel and effective means, readily accessible for adjustment, to vary the natural resonant frequency of the vibratile element of my improved vibratory converter by the bodily adjustment of the permanent magnet element which cooperates in the vibration of the vibratile element at a predetermined frequency different from said natural resonant frequency. Another major object of the invention is to provide my novel vibratory converter with simple and effective adjustment provisions for equalizing the periods during which the contact carried by the vibratile element is out of engagement first with one and then with the other of the two cooperating, oppositely disposed and relatively stationary contacts.

Still another major object of the invention is to provide a stationary support for a vibrating contact element and for an associated permanent magnet in a vibratory converter, and to provide means for adjusting the vibratile element angularly relative to said magnet about an axis remote from said magnet, and for adjusting the latter toward and away from said axis.

Another object of the invention is to provide means for varying the relative positions of the vibratile armature element and the associated permanent magnet of a vibratory converter, thereby to vary the natural resonant frequency of the vibratile element, and to provide means for varying the magnetic relation between the vibratile element and the energizing coil therefor so as to compensate for the variations in the amplitude of vibration of the element produced by the adjustments of the relative positions of the magnet and element.

One specific object of the invention is to provide adjustment provisions for a vibratory converter which include a single key-like adjustment device operable in one condition to adjust the relative positions of a vibratile element and an associated permanent magnet in the general direction of the length of the element, and operable in another condition to adjust relatively the element and the magnet in a direction transverse to the first mentioned direction.

Another specific object of the present invention is to provide a vibratory converter comprising a vibratile element including an armature, an associated magnet, and magnetic shunt means for varying the magnetic relation between said armature and magnet.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a front elevation of a preferred form of vibratory converter with its casing in section;

Fig. 2 is a side elevation of the converter shown in Fig. 1 with its casing removed and its upper portion in section on the line 2—2 of Fig. 1;

In Figs. 1 through 5, I have illustrated a desirable embodiment of the present invention comprising a base member A of insulating material in the form of a disc and a supporting plate B extending away from the base A and attached thereto by means of screws extending through transverse portions B' of the plate B. Adjacent its upper end, the plate B supports a permanent magnet C, an associated magnet shield member D, and an energizing coil E. A vibratile element or reed F has its lower portion anchored to a lower portion of the plate B for vibration about a horizontal axis which is perpendicular to the plate. The upper end portion of the element F extends through the coil E. Mounted on the upper end portion of the vibratile reed F is an armature G. Insofar as it has been just described, the vibratory converter or vibrator illustrated in Figs. 1 through 5 is of a type and form illustrated in my aforementioned prior patents. The vibrator shown in Figs. 1 through 5 differs, however, from those shown in said prior patents in that the magnet C and its shield D are vertically adjustable on the plate B, and in that the vibrating reed F and associated stationary contacts and stop elements are mounted on a plate H which is parallel to the plate B and is located in front of the latter, and which is mounted on the plate B for angular adjustment relative to the latter about an axis perpendicular to the plate B.

Figure 5:
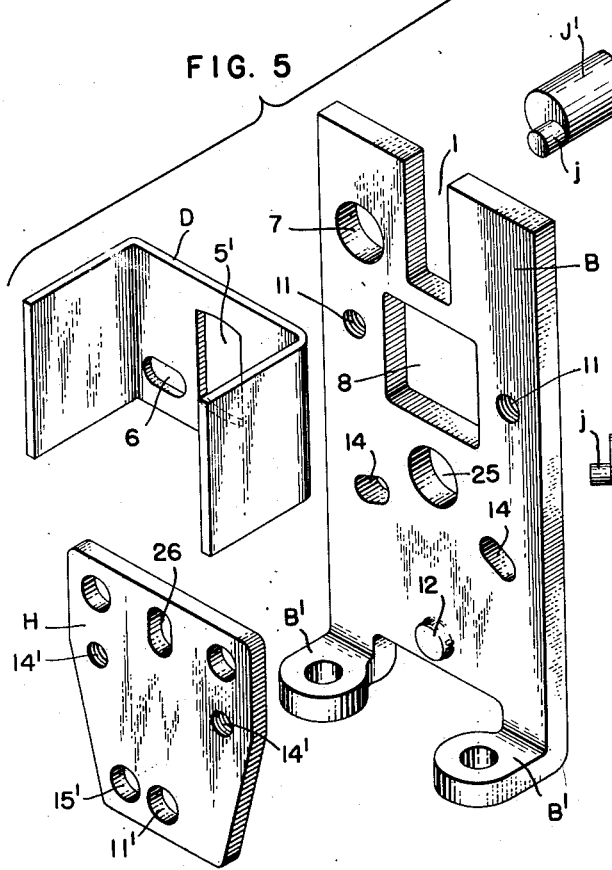
Fig. 5 is an exploded prospective view of certain related elements of the device of Figs. 1 through 4.

As is shown best in Fig. 5, the plate B is formed with a central, vertically extending slot 1 in its upper portion. The slot 1 is open at its upper end to receive a stud I rigidly connected to the magnet C as best seen from Figs. 2 and 3. The magnet C, as shown, is of horse-shoe form. The stud I includes an enlarged oblong body portion 2 which is received in the slot 1 with its elongated vertical sides in engagement with the side walls of the slot. One end portion 2' of the stud I is threaded for engagement with a clamping nut 3 and a washer 3' which hold the stud I in engagement with the plate B. The opposite end portion of the stud I is a rod-like part 4 having a diameter which is smaller than the internal diameter of the horse-shoe magnet C. The magnet C surrounds the stud portion 4 and is rigidly clamped against the body portion 2 of the stud I by means of a washer 5 engaging the face of the magnet C and surrounding the part 4. As shown, the front end of the part 4 is enlarged or spun over so as to overlap the face of the washer 5 and to clamp the latter against the face of the magnet C.

Figure 6:
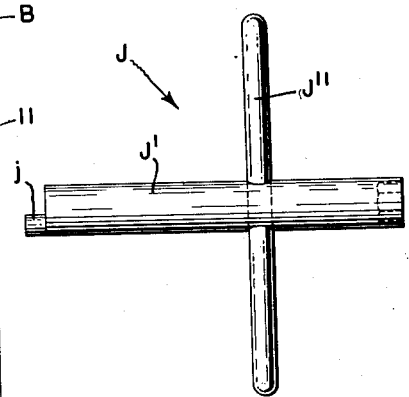
Fig. 6 is a side elevation of an adjusting tool partially shown in Fig. 5.

As shown in Fig. 5, the magnet shield D is in the form of a thin steel plate bent into U shape and formed with a slot 5' in its yoke portion which receives and fits snugly about the oblong body portion 2 of the stud member I. The leg portions of the shield D are separated by a distance greater than the external diameter of the permanent magnet C, and extend alongside the latter as is clearly shown in Figs. 1 and 3. The yoke portion of the shield D is also formed with a horizontally elongated slot 6 having a portion in register with a circular opening 7 in the plate B at one side of the lower portion of the slot 1. The opening 7 has a diameter greater than the width of the slot 6, and is adapted to receive snugly the cylindrical body portion J' of an adjusting tool J. The latter is formed with an eccentric pin j which extends into the shield slot 6 when the adjacent end portion of the body J' is received in the circular opening 7. As will be apparent, the rotation of the tool J, when operatively associated with the plate B and the shield D, will adjust the stud I vertically in the slot 1 of the plate B. The clamping nut 3 may be slightly backed off to facilitate the vertical adjustment of the magnet C and its shield D. To facilitate the rotation of the tool J, the latter includes a cross bar or handle J'', as shown in Fig. 6.

Accordingly, a major difference between the vibrator of the present invention as just described and the vibrators shown in my aforementioned prior patents stems from the fact that the present vibrator includes readily operable means for effecting the adjustment of the position of the permanent magnet C relative to the reed F and the armature G. Such an adjustment is provided in order to permit the distance between said magnet and armature to be readily and accurately set at any desired value within the range of positions available, and to permit this distance to be readily changed to a new desired value whenever conditions make such a change desirable.

The significance of being able to adjust the position of the magnet C to desired distances from the armature G in the vibrator of the present invention will now be discussed. In this connection, I have found that the effect of such adjustment is to vary the extent of the drag or retardation exerted on the armature G by the magnet C. I have also found that this action, in turn, is effective to vary the natural resonant frequency of the reed F. Accordingly, the means which I have disclosed herein for permitting movement of the magnet C relative to the reed F constitute means to permit the natural resonant frequency of the reed F to be readily and accurately adjusted to predetermined, desired values.

As is explained in considerable detail in my aforementioned prior Patent No. 2,587,236, it is desirable in practice to provide a vibratory converter of the general type disclosed herein with adjustment means for varying the natural resonant vibration frequency of the vibratile element. It is also essential in practice that the actual vibration frequency of the vibratile element be different from the natural vibration frequency of the element and from the harmonics of the last mentioned frequency. If the natural resonant frequency of the vibrating element or a harmonic of this frequency coincides with the frequency at which the vibratile element is driven or vibrated, instable operation results.

On the other hand, when the fundamental and harmonics of the natural resonant frequency of the vibratile element are different from the vibration frequency at which the vibratile element is driven, considerably greater power is required to establish and maintain the vibration, but inherent instability of operation and the effect of external disturbances upon the vibration of the vibratile element are greatly reduced. Accordingly, it is highly desirable to provide means for adjusting the natural resonant frequency of the vibratile element in a vibratory converter which is intended for use at different frequencies.

Moreover, in the quantity production of vibratile elements intended to be of the same dimensions and compositions, the natural resonant frequency varies from element to element, due to machining difficulties in maintaining close tolerances in dimensions, variations in the weight and the distribution of the weight of the elements, variations in the distribution of the weight of the iron armatures attached to the elements, and variations in the pressures exerted by the contacted members.

In my aforementioned prior Patent No. 2,587,236, I have disclosed means for adjusting the natural resonant frequency of vibration of a vibratile element by adjusting the armature carried by the element longitudinally of the latter. There are important advantages, however, in effecting the adjustment of the natural resonant frequency of such a reed by effecting the adjustment of the permanent magnet relative to the reed by the bodily adjustment of the magnet itself. For one thing, the adjustment of the magnet can be effected without risk of subjecting the vibratile element to any mechanical stress, regardless of whether that element is or is not vibrating when the adjustment is made. Furthermore, the accurate bodily adjustment of the magnet is much more easily affected than is the accurate adjustment of the armature along the element.

In view of the foregoing, it can readily be seen that the present vibrator includes novel means for permitting the accurate adjustment of the natural resonant frequency of the vibratile reed to be made while the reed is in vibration, and to be made with facility and without any risk of damage to the reed.

The plate B is formed with a rectangular opening 8 to receive the rear portion of the coil E and its supporting form or bobbin. As shown, the coil E is normally secured in place by a yoke-shaped part 9 having its end portions clamped against the front side of the plate B by screws 10 which extend through threaded openings 11 in the plate B.

Another major difference between the vibrator shown in Figs. 1 through 5 and the vibrators shown in my previously mentioned prior patents arises from the fact that the present vibrator contact assembly, including the reed F and associated parts, is directly mounted on the plate H, which in turn is mounted on the plate B to turn about an axis perpendicular to the plate B and remote from the permanent magnet C. Thus, as shown, the plate H is formed with a circular opening 11' in its lower portion for receiving the end portion of a pivot 12 projecting from the front side of the lower portion of the plate B. The pivot 12 may well be an extruded portion of the plate B. The plate H is normally anchored to the plate B by means of two clamping screws 13 which extend through slots 14 in the plate B and into threaded openings 14' in the plate H, the heads of the screws 13 bearing against washers interposed between said heads and the rear side of the plate B. As is clearly shown in Fig. 5, the elongated slots 14 are tangential to a circle concentric with the pivot portion 12 of the plate B.

Figure 3:
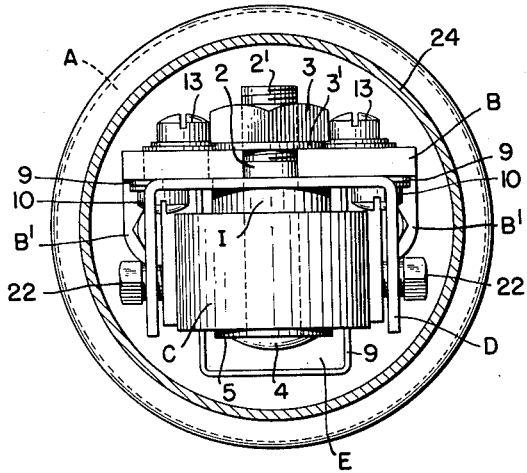
Fig. 3 is a plan section on the line 3—3 of Fig. 1.
Figure 4:
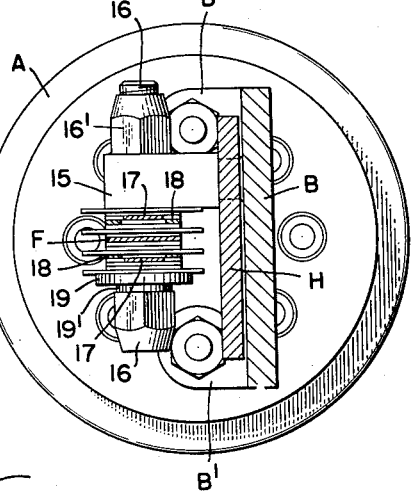
Fig. 4 is a plan section on the line 4—4 of Fig. 2.

The plate H has secured to its front surface a stud or projection 15, as best seen from Figs. 1, 2, and 4. The projection 15 is secured to the plate H by a cylindrical portion which passes through a hole 15' in the plate H and which is spun over on the rear surface of the plate H. The projection 15 is formed with a horizontal opening through which extends a horizontal clamping bolt 16 in front of and parallel to the plate H. The bolt 16 is supplied with a suitable insulating sleeve 16''. The perforated lower ends of the vibratile reed F, spring contacts 17, and spring stops 18, and intervening terminal lugs and insulating discs or washers, are all clamped by the bolt 16 and a nut 16' to the projection 15. A washer 19 and a lock washer 19' are also clamped in the assembly just described. With the reed F and associated contact assembly parts thus mounted on the plate H, the armature G on the reed F may be laterally adjusted relative to the magnet C by the angular adjustment of the plate H about the pivot 12 carried by the plate B. The angular movement of the plate H required to accomplish the needed adjustment of the armature G relative to the permanent magnet C is so small that the direction of adjustment of the armature G, and the position of the clamping bolt 16, may each be described as generally horizontal, though the bolt 16 can obviously be in a truly horizontal position only in one adjustment position of the plate H relative to the plate B.

Each of the spring contacts 17 carries a transverse contact member 20 having its contacting end adjacent a contact member 21 carried by the reed F. The plate H also rigidly supports adjustable stops 22 which are in engagement with the upper ends of the respectively adjacent spring stops 18. Ordinarily, the contact assembly is advantageously so arranged that both of the contact members 20 are in engagement with the interposed contact 21 of the reed F when the latter is in its central or intermediate position.

As in my aforementioned prior patents, the base A is provided with terminal projections or prongs 23 which are adapted to be inserted in a suitable socket. The vibrator is also provided with a casing 24 which is detachably secured to the base A and encloses the vibrator components located above the base.

The assembly comprising the reed F and the other parts mounted on the plate H includes nothing claimed as novel herein, but, on the contrary, is like the corresponding assembly disclosed in my aforementioned prior patents and therein mounted on a stationary support similar to the above described plate B. In consequence, further explanation or description of the contact components mounted on the plate H is believed to be unnecessary herein.

The adjustment which is made readily possible by mounting the vibrator contact assembly on the angularly adjustable supporting plate H facilitates the maintenance of the desired equality in the lengths of the time periods during which one or the other of the contact members 20 is out of engagement with the contact member 21 on the reed F. The angular adjustment of the plate H may be readily effected by inserting the body portion J' of the tool J into an opening 25 which is provided in the plate B, and by simultaneously inserting the eccentric portion j of the tool J into a vertically elongated slot 26 which is provided in the plate H. Rotation of the tool J will then cause the plate H to be rotated relative to the plate B, and will cause the entire contact assembly, including the reed F and armature G, to be moved laterally relative to the coil E and magnet C. Such an adjustment constitutes a means for making it readily possible to locate the armature G symmetrically in the field between the poles of the magnet C.

It is desirable to locate the armature G relative to the magnet C as just described since it is only under this condition that the desired equality of contacting time for the two contacts 20 will be maintained in the presence of changes in the magnitude of the voltage supplied to the coil E. In other words, if the armature G is not symmetrically located in the aforementioned field, changes in the magnitude of the energizing voltage for the coil E will upset previously obtained contacting time equality. Accordingly, it is highly desirable to provide an arrangement which is operative to permit the armature G to be precisely located laterally relative to the poles of the magnet C, and the pivotal mounting of the plate H on the plate B, together with the means utilizing the tool J, constitute such an arrangement.

Moreover, the construction just described provides a further advantage in that it permits the lateral adjustment of the armature G relative to the magnet C to be effected without disturbing the initially made adjustments of the stops 22.

Figure 7:
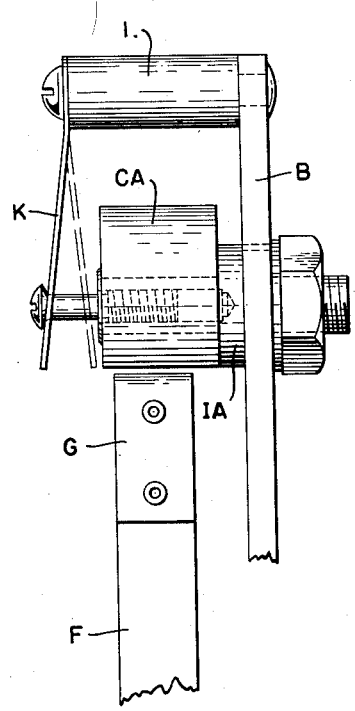
Fig. 7 is an elevation of a different arrangement in which a magnetic shunt is adjustable to vary the magnetic relation between a permanent magnet and a vibratile armature.

In the modification diagrammatically illustrated in Fig. 7, the natural resonant frequency of the vibratile element F is varied by the adjustment of a magnetic shunt K, without any change in the relative positions of the armature G and permanent magnet CA. The magnet CA shown in Fig. 7 may be identical in construction to the previously described magnet C, but, as shown, the magnet CA is rigidly mounted on the associated plate B by an element IA. The magnetic shunt K of Fig. 7 is in the form of a flexible strip of iron, preferably of relatively high permeability, which has one end anchored to one end of a post L which has its other end anchored to the plate B. As shown, the post L is at the opposite side of the magnet CA from the reed F. As the free end of the magnetic shunt K is moved toward and away from the pole tips of the magnet CA, it decreases and increases the strength of the external magnetic field emanating from the pole tips of the magnet CA and acting on the armature G. Accordingly, the adjustment of the member K is operative to vary the natural resonant frequency of the reed F, and to provide a means for readily and accurately setting this frequency to desired values.

Figure 8:
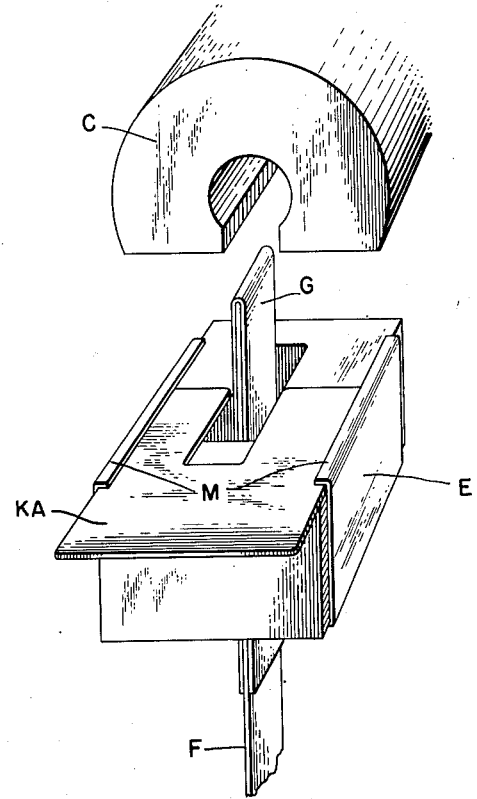
Fig. 8 is a prospective view of a novel arrangement in which a magnetic shunt is adjustable to vary the magnetic relation between a vibratile element and the energizing coil therefor.

In the modification illustrated diagrammatically in Fig. 8, the vibratile reed F, its armature G, the coil E, and the permanent magnet C may be arranged for relative adjustment of the reed and magnet by the bodily adjustment of the magnet relative to its supporting structure as in Figs. 1 through 5. With this arrangement, the relative adjustment of the magnet C and armature G toward and away from one another not only varies the natural resonant frequency of the reed, but also varies the amplitude of the reed and armature vibration or swing. Specifically, this amplitude diminishes as the distance between the permanent magnet and the armature increases.

With the arrangement shown in Fig. 8, the effect of the relative adjustment of the permanent magnet and armature on the amplitude of armature vibration may be compensated for by an adjustment of a magnetic shunt KA. The latter, in the form diagrammatically shown in Fig. 8, is a slotted strip of soft iron mounted in a guideway M provided at the top of the supporting bobbin for the coil E adjacent to the magnet C. The shunt KA is movable in the guideway M in a horizontal direction parallel to the sides of the reed F.

When the shunt KA covers a minimum of the top surface of the coil E, a maximum of the magnetic flux produced by the coil acts on the armature G. As the shunt is progressively moved to cover a progressively greater portion of the coil E, the magnetic flux reaching the top of the armature G progressively diminishes. When the shunt covers the entire top surface of the coil, little flux reaches the armature. Thus, with the arrangement shown in Fig. 8, the adjustment of the shunt KA to cover more or less of the coil E can be made to compensate for variations in the amplitude of the reed swing which would otherwise result from the relative adjustment of the armature G and permanent magnet C effected to vary the natural resonant vibration frequency of the reed and armature.

It is noted that the use of the shunt KA of Fig. 8 is also effective to provide adjustments of the vibration amplitude of a reed when the natural resonant frequency of the latter is varied by adjustment of an armature longitudinally of the reed as contemplated in my aforementioned prior Patent No. 2,587,236.

While, in accordance with the provision of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is as follows:

1. In an electrical switching device comprising a supporting structure, a vibratile element having one end supported by said structure and having a second end, a permanent magnet supported by said structure and having its poles adjacent said second end of said element and operative to exert a magnetic effect thereon, first and second cooperating contact means respectively supported by said element and said structure, and winding means adapted to be energized with alternating current and operative, when so energized, to vibrate said second end of said element at the frequency of the alternating energizing current in a path substantially transverse to the length of said element, the improvement comprising adjustable means physically independent of said element and associated with said magnet and operative, when adjusted, to vary the magnitude of the magnetic effect exerted by said magnet on said second end of said element, thereby to vary the natural resonant frequency of vibration of said element, and other adjustable means associated with said element and said second contact means and operative, when adjusted, to move said element and said second contact means as a unit relative to said structure and said magnet in a direction to cause said second end of said element to move in the general direction of said path, thereby to vary the mean position of said second end of said element substantially transversely with respect to the poles of said magnet, said other adjustable means comprising a supporting portion, means operative to secure said one end of said element and said second contact means rigidly to said supporting portion, and means operative to secure said supporting portion to said structure for pivotal movement relative to said structure in a plane parallel to the plane thereof and about an axis which is substantially perpendicular to the direction of the length of said element.

2. In an electrical switching device comprising a supporting structure, a vibratile element having one end supported by said structure and having a second end, a permanent magnet supported by said structure and having its poles adjacent said second end of said element and operative to exert a magnetic effect thereon, first and second cooperating contact means respectively supported by said element and said structure, and winding means adapted to be energized with alternating current and operative, when so energized, to vibrate said second end of said element at the frequency of the alternating energizing current in a path substantially transverse to the length of said element, the improvement comprising adjustable means physically independent of said element and associated with said magnet and operative, when adjusted, to vary the magnitude of the magnetic effect exerted by said magnet on said second end of said element, thereby to vary the natural resonant frequency of vibration of said element, said adjustable means including a portion which is operative, when adjusted, to move said magnet relative to said structure and relative to said second end of said element substantially in the direction of the length of said element, thereby to vary the distance between said magnet and said second end of said element.

3. An improved device as specified in claim 2, wherein said adjustable means comprises supporting means, means operative to secure said magnet rigidly to said supporting means, and means operative to secure said supporting means to said structure for restricted movement relative thereto.

4. An imprived device as specified in claim 2, wherein said structure is a plate-like member provided with a slot-like opening lying in the plane of said member and extending in said plane substantially in the direction of the length of said element adjacent said second end of the latter, wherein said member is also provided with a circular opening lying in said plane adjacent said slot-like opening, and wherein said adjustable means comprises stud means, mounting means operative to secure said magnet rigidly to said stud means, means operative to secure said stud means in said slot-like opening for restricted movement of said magnet substantially in the direction of the length of said element, and a plate in driving engagement with said stud means and provided with a slot lying in the plane of said plate and having a width which is substantially smaller than the diameter of said circular opening, said plate being supported by said stud means in a plane parallel to that of said member with said slot in register with said circular opening and extending in a direction which is substantially at right angles to the length of said element, said plate, stud means, and magnet being adapted to be moved substantially in the direction of the length of said element by the rotation of a tool having a circular body portion adapted to be received in said circular opening, and having a tangential circular projection adapted to be simultaneously received in said slot.

5. In an electrical switching device comprising a supporting structure, a vibratile element having one end supported by said structure and having a second end, a permanent magnet supported by said structure and having its poles adjacent said second end of said element and operative to exert a magnetic effect thereon, first and second cooperating contact means respectively supported by said element and said structure, and winding means adapted to be energized with alternating current and operative, when so energized, to vibrate said second end of said element at the frequency of the alternating energizing current in a path substantially transverse to the length of said element, the improvement comprising adjustable means physically independent of said element and associated with said magnet and operative, when adjusted, to vary the magnitude of the magnetic effect exerted by said magnet on said second end of said element, thereby to vary the natural resonant frequency of vibration of said element, said adjustable means including a strip of ferromagnetic material, means operative to secure one end of said strip rigidly to said structure remote from the poles of said magnet with the second end of said strip in flux shunting relationship to the poles of said magnet, and means operative, when adjusted, to move said second end of said strip relative to the poles of said magnet and hence to shunt more or less of the magnetic field of said magnet from the vicinity of said second end of said element.

6. In an electrical switching device comprising a supporting structure, a vibratile element having one end supported by said structure and having a second end, a permanent magnet supported by said structure and having its poles adjacent said second end of said element and operative to exert a magnetic effect thereon, first and second cooperating contact means respectively supported by said element and said structure, and winding means adapted to be energized with alternating current and operative, when so energized, to vibrate said second end of said element at the frequency of the alternating energizing current in a path substantially transverse to the length of said element, the improvement comprising adjustable means associated with said element and said second contact means and operative, when adjusted, to move said element and said second contact means as a unit relative to said structure and said magnet in a direction to cause said second end of said element to move in the general direction of said path, thereby to vary the mean position of said second end of said element substantially transversely with respect to the poles of said magnet, said adjustable means comprising a supporting portion, means operative to secure said one end of said element and said second contact means rigidly to said supporting portion, and means operative to secure said supporting portion to said structure for pivotal movement relative to said structure in a plane parallel to the plane thereof and about an axis which is substantially perpendicular to the direction of the length of said element.

7. An improved device as specified in claim 6, wherein said structure is a plate-like member provided with a pivot portion extending perpendicularly from the plane of said member at a distance from said magnet, wherein said member is also provided with a circular opening lying in said plane along a line connecting said pivot and the center of said magnet, wherein said supporting portion is a plate provided with a supporting opening operative to receive said pivot for relative, pivotal movement of said plate and member in parallel planes, said plate being provided also with a slot lying in the plane of said plate, having a width which is substantially smaller than the diameter of said circular opening, extending in a direction which is substantially coincident with the direction of the length of said element, and lying on a line which passes through said pivot, and wherein said plate is supported on said pivot with said slot in register with said circular opening, said plate being adapted to be moved around said pivot by the rotation of a tool having a circular body adapted to be received in said circular opening, and having a tangential circular projection adapted to be simultaneously received in said slot.

8. In an electrical switching device comprising a supporting structure, a vibratile element having one end supported by said structure and having a second end, a permanent magnet supported by said structure and having its poles adjacent said second end of said element and operative to exert a magnetic effect thereon, first and second cooperating contact means respectively supported by said element and said structure, and winding means adapted to be energized with alternating current and operative, when so energized, to vibrate said second end of said element at the frequency of the alternating energizing current in a path substantially transvers to the length of said element, the improvement comprising first adjustable means physically independent of said element and associated with said magnet and operative, when adjusted, to move said magnet relative to said structure and relative to said second end of said element substantially in the direction of the length of said element and hence to vary the distance between said magnet and said second end of said element, thereby to vary the magnitude of the magnetic effect exerted by said magnet on said second end of said element and hence to vary the natural resonant frequency of vibration of said element, and second adjustable means associated with said element and said second contact means and operative, when adjusted, to move said element and said second contact means as a unit relative to said structure and said magnet in a direction to cause said second end of said element to move in the general direction of said path, thereby to vary the mean position of said second end of said element substantially transversely with respect to the poles of said magnet.

9. An improved device as specified in claim 8, wherein said structure is a plate-like member provided with a slot-like opening lying in the plane of said member and extending in said plane substantially in the direction of the length of said element adjacent said second end of the latter, a first circular opening lying in said plane adjacent said slot-like opening, a second circular opening having substantially the same diameter as said first circular opening and lying in said plane remote from said slot-like opening, and a pivot portion extending perpendicularly from said plane at a greater distance from said slot-like opening than said second circular opening, said slot-like opening, said second circular opening, and said pivot lying on a line substantially coincident with the direction of the length of said element, wherein said first adjustable means comprises stud means, mounting means operative to secure said magnet rigidly to said stud means, means operative to secure said stud means in said slot-like opening for restricted movement of said magnet substantially in the direction of the length of said element, and a first plate in driving engagement with said stud means and provided with a slot lying in the plane of said first plate and having a width which is substantially smaller than the diameter of said first circular opening, said first plate being supported by said stud means in a plane parallel to that of said member with said slot in register with said first circular opening and extending in a direction which is substantially at right angles to the length of said element, said first plate, stud means, and magnet being adapted to be moved substantially in the direction of the length of said element by the rotation of a tool having a circular body portion adapted to be received in said first circular opening, and having a tangential circular projection adapted to be simultaneously received in said slot, wherein said second adjustable means comprises a second plate provided with a supporting hole operative to receive said pivot for relative, pivotal movement of said second plate and member in parallel planes, and provided also with a slot lying in the plane of said second plate, having a width which is substantially identical to that of said slot in said first plate, extending in a direction which is substantially coincident with the direction of the length of said element, and lying on a line which passes through said pivot, said one end of said element and said second contact means being rigidly secured to said second plate, and wherein said second plate is supported on said pivot with its slot in register with said second circular opening, said second plate being adapted to be moved around said pivot by the rotation of said tool when the body portion thereof is received in said second circular opening and the projection of said tool is simultaneously received in the last mentioned slot.

10. In an electrical switching device comprising a supporting structure, a vibratile element having one end supported by said structure and having a second end, a permanent magnet supported by said structure and having its poles adjacent said second end of said element and operative to exert a magnetic effect thereon, first and second cooperating contact means respectively supported by said element and said structure, and winding means adapted to be energized with alternating current and operative, when so energized, to produce a pulsating magnetic flux in the vicinity of said second end of said element which is effective to vibrate said second end of said element at the frequency of the alternating energizing current in a path substantially transverse to the length of said element, the improvement comprising adjustable means operative, when adjusted, to vary the distance between said second end of said element and said magnet, thereby to vary the natural resonant frequency of vibration of said element, and adjustable shunting means associated with said winding means and operative, when adjusted, to vary the magnitude of the pulsating magnetic flux which reaches said second end of said element from said winding means, thereby to vary the amplitude of vibration of said element in said path.

11. An improved device as specified in claim 10, wherein said winding means comprises a spool-like support having flat end portions connected by a body portion of reduced cross-section which is provided with an axial opening extending through said body portion at right angles to the faces of said end portions, said winding means also comprising a winding wound on said body portion between said end portions and surrounding said axial opening, wherein said element extends through said axial opening with said second end of said element adjacent one of the exterior faces of one of said end portions, and wherein said shunting means comprises a U-shaped plate of ferromagnetic material, and guide means operative to support said plate in close proximity to and parallel to said one of said faces and to permit said plate to be adjusted in said guide means to cover more or less of said face, said second end of said element being positioned between the legs of said plate.

References Cited in the file of this patent

UNITED STATES PATENTS

| Number | Name | Date |
|---|---|---|
| 1,284,480 | Shreeve | Nov. 12, 1918 |
| 2,532,274 | Side | Nov. 28, 1950 |
| 2,547,026 | Winkler | Apr. 3, 1951 |